US008369470B2

United States Patent
Mobin et al.

(10) Patent No.: US 8,369,470 B2
(45) Date of Patent: Feb. 5, 2013

(54) METHODS AND APPARATUS FOR ADAPTING ONE OR MORE EQUALIZATION PARAMETERS BY REDUCING GROUP DELAY SPREAD

(75) Inventors: Mohammad S. Mobin, Orefield, PA (US); Kenneth W. Paist, Spring City, PA (US); Lane A. Smith, Easton, PA (US)

(73) Assignee: Agere Systems, LLC, Allentown, PA (US)

( * ) Notice: Subject to any disclaimer, the term of this patent is extended or adjusted under 35 U.S.C. 154(b) by 1107 days.

(21) Appl. No.: 12/323,155

(22) Filed: Nov. 25, 2008

(65) Prior Publication Data

US 2010/0128828 A1    May 27, 2010

(51) Int. Cl.
*H03D 1/06* (2006.01)
*H03K 5/01* (2006.01)
(52) U.S. Cl. .......................... 375/348; 375/350; 375/253
(58) Field of Classification Search .................. 375/348, 375/349

See application file for complete search history.

(56) References Cited

U.S. PATENT DOCUMENTS

| 6,980,824 B2 * | 12/2005 | Hsu et al. ...................... 455/522 |
| 7,742,520 B2 * | 6/2010 | Simpson et al. ............... 375/229 |
| 7,920,621 B2 * | 4/2011 | Wong et al. .................... 375/229 |
| 2009/0249160 A1 * | 10/2009 | Gao et al. ...................... 714/752 |

* cited by examiner

*Primary Examiner* — David Ometz
*Assistant Examiner* — Qutbuddin Ghulamali
(74) *Attorney, Agent, or Firm* — Ryan, Mason & Lewis, LLP

(57) ABSTRACT

Methods and apparatus are provided for adapting one or more equalization parameters in a communications system by reducing group delay spread. According to one aspect of the invention, one or more equalization parameters in a communications system are adapted by detecting one or more predefined run length patterns in a received signal, such as a plurality of consecutive same-valued bits; evaluating a transition latch value for each of the detected predefined run length patterns, wherein the transition latch value provides an indication of whether the received signal is under-equalized or over-equalized; and adjusting the one or more equalization parameters of the communications system based on the evaluation of the transition latch value. The adjusted equalization parameters may be employed to equalize intersymbol interference. A data eye monitor can be employed to evaluate the transition latch value.

20 Claims, 5 Drawing Sheets

METHODS AND APPARATUS FOR ADAPTING ONE OR MORE EQUALIZATION PARAMETERS BY REDUCING GROUP DELAY SPREAD

FIELD OF THE INVENTION

The present invention is related to techniques for processing a received signal in a communication system and, more particularly, to techniques for improving jitter tolerance in a received signal.

BACKGROUND OF THE INVENTION

Digital communication receivers typically must sample an incoming waveform and then reliably detect the sampled data. Signals traveling through a dispersive medium typically suffer from group delay and attenuation. The group delay creates pulse spreading, inter-symbol interference and other noise. The group delay reduces the size of the data eye opening and thereby increases the jitter margin. In order to compensate for such channel distortions, communication receivers often employ well-known filtering, amplification and equalization techniques. For example, zero equalization or decision-feedback equalization (DFE) techniques (or both) are often employed. Such equalization techniques are widely-used for removing intersymbol interference and to improve the noise margin. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein.

A need therefore exists for methods and apparatus for improving the jitter tolerance in a received signal. A further need exists for methods and apparatus for improved jitter tolerance using a minimization of the group delay spread.

SUMMARY OF THE INVENTION

Generally, methods and apparatus are provided for adapting one or more equalization parameters in a communications system by reducing group delay spread. According to one aspect of the invention, one or more equalization parameters in a communications system are adapted by detecting one or more predefined run length patterns in a received signal, such as a plurality of consecutive same-valued bits, evaluating a transition latch value for each of the detected predefined run length patterns, wherein the transition latch value provides an indication of whether the received signal is under-equalized or over-equalized; and adjusting the one or more equalization parameters of the communications system based on the evaluation of the transition latch value. The adjusted equalization parameters, such as zero values for a pre-amplifier, may be employed, for example, to equalize intersymbol interference. A data eye monitor can be employed to evaluate the transition latch value.

The predefined run length patterns can be detected in a received signal until at least N predefined run length patterns are detected, where N is a window for which statistics are collected before the adjusting step is performed. In addition, transition latch value for each of the detected predefined run length patterns can be accumulated for a predefined window. In addition, a clock and data recovery system in the communications system can be allowed to settle following the adjusting step.

A more complete understanding of the present invention, as well as further features and advantages of the present invention, will be obtained by reference to the following detailed description and drawings.

DETAILED DESCRIPTION

Figure 1:
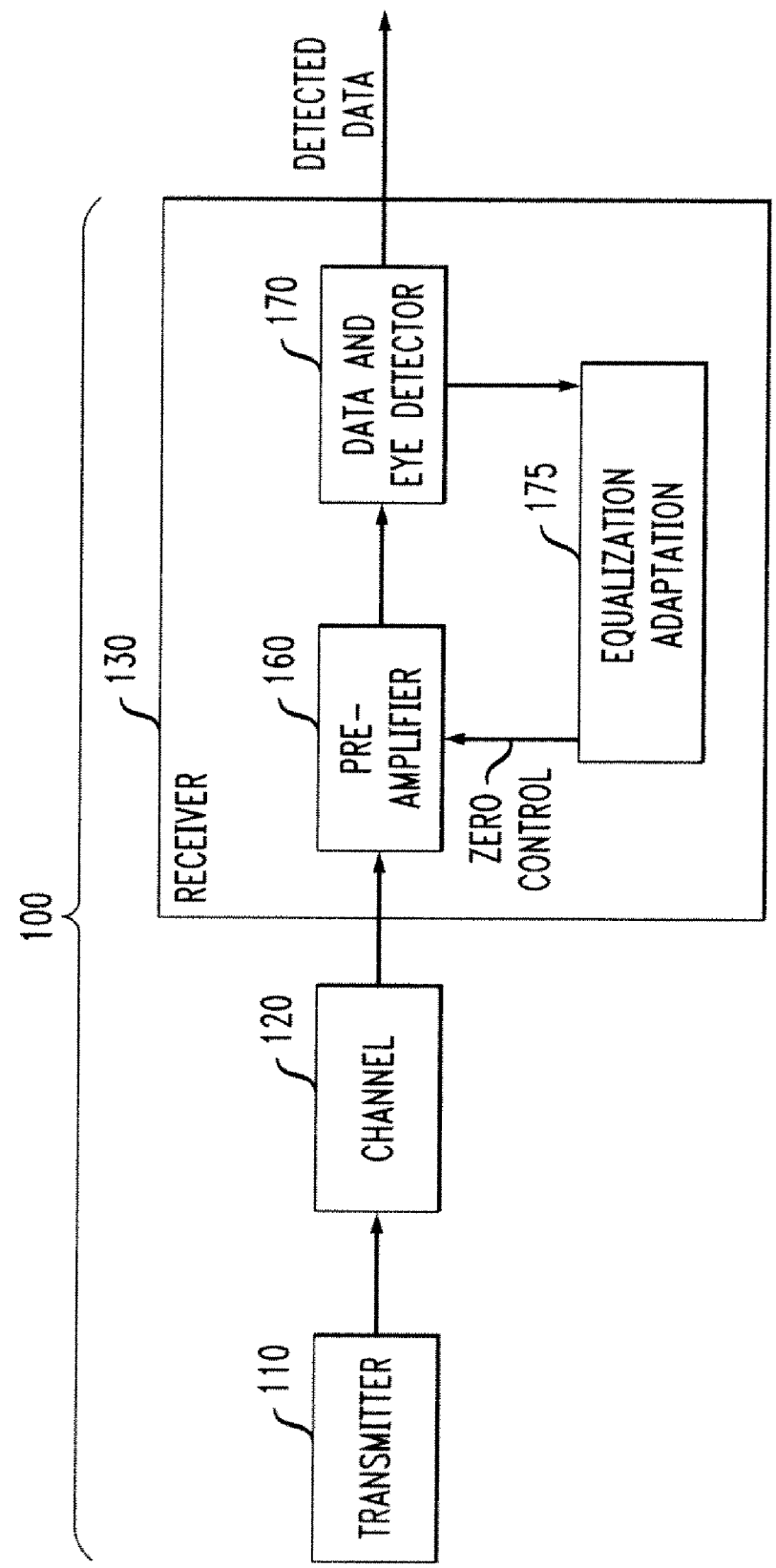
FIG. 1 is a block diagram of a communication system in which the present invention can operate.

The present invention provides methods and apparatus improved jitter tolerance using a minimization of the group delay spread. FIG. 1 is a block diagram of a communication system 100. As shown in FIG. 1, a transmitter 110 transmits data over a channel 120 for receipt by a receiver 130. The channel 120 can be any dispersive channel, such as a backplane, an optical link or an electrical connection, or a combination of the foregoing. Pre-emphasis techniques (not shown) are optionally applied in the transmitter 110 before the signal is transmitted over the channel 120. In addition, equalization techniques (not shown), such as zero equalization and/or decision feedback equalization (DFE) are optionally applied in the receiver 130.

As shown in FIG. 1, the receiver 130 includes a pre-amplifier 160, in a known manner. The transfer characteristics of the pre-amplifier 160 are discussed further below in conjunction with FIGS. 2A and 2B. The received signal that is applied to the receiver 130 is discussed further below in conjunction with FIGS. 3A and 3B.

As discussed below in conjunction with FIGS. 4A through 4C, the present invention recognizes that a received signal will typically exhibit group delay spread. Generally, a signal having a consecutive plurality of zeroes and/or ones, commonly referred to as a run length signal, will be delayed at the receiver more than a short run length signal, since the low frequency components will experience more group delay compared to high frequency components. As used herein, a run length signal has at least a predefined number of consecutive zeroes or ones (or both) (i.e., a plurality of consecutive same-valued bits). For example, a run length signal can require at least three consecutive ones or zeroes (1110/001), or at least two consecutive ones or zeroes (110/001). It is noted that a run length pattern of 110/001 will cover all run-length cases and exclude clock patterns.

A long run length signal exhibits more delay than a short run length signal. According to one aspect of the present invention, jitter tolerance is improved by using the delay caused by the long run length signals as a criterion for adapting the pre-amplifier 160. The pre-amplifier 160 filters the received signal to improve the jitter tolerance, as discussed further below in conjunction with FIGS. 4 and 5. Generally, the pre-amplifier 160 reduces the group delay spread and the clock and data recovery system will roam in a smaller transition area and thus create less jitter.

Generally, a data eye monitor is employed in an exemplary embodiment to monitor a transition latch upon detection of a predefined run length pattern (such as x110/x001). The transition latch polarity values (rising or falling edge) are accumulated over a predefined number of detected run length patterns. The accumulated latch values are then used to adapt the equalization parameters, such as zero values for the pre-amplifier 160.

The receiver 130 also includes a data and eye detector 170 for recovering the transmitted information. The data and eye detector 170 may be embodied, for example, using to the data eye monitoring techniques described, for example, in U.S. patent application Ser. No. 11/540,946, filed Sep. 29, 2006, entitled "Method And Apparatus For Determining Latch Position For Decision-Feedback Equalization Using Single-Sided Eye," incorporated by reference herein.

In one exemplary embodiment, the data eye statistics generated by the data and eye detector 170 are processed by an equalization adaptation block 175 to evaluate the group delay spread and determine an appropriate zero control correction value. The zero control correction value will apply an appropriate amount of low pass filtering (for over-equalized signals) or high pass filtering (for under-equalized signals) to offset the group delay spread. The equalization adaptation block 175 is discussed further below in conjunction with FIG. 5.

Figure 2A:
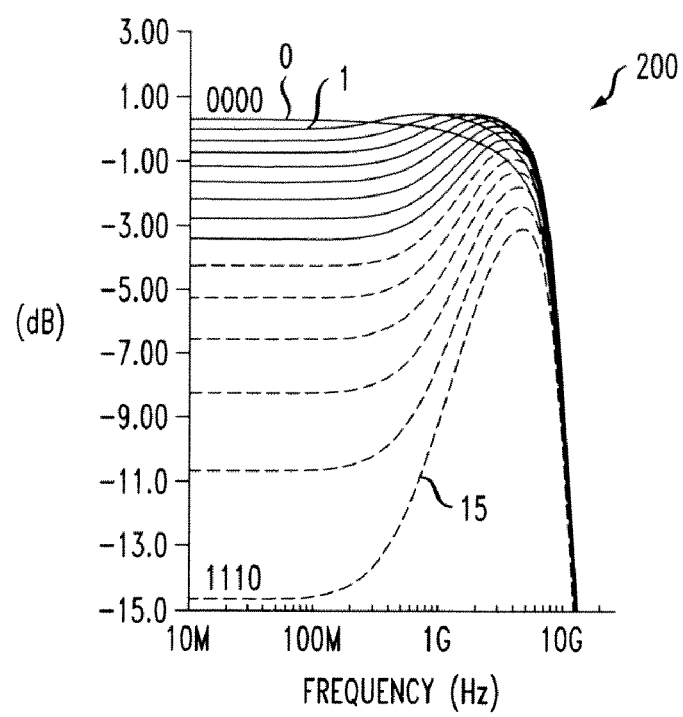
FIGS. 2A and 2B illustrate the transfer characteristics of the first and second stages, respectively, of the pre-amplifier of FIG. 1.
Figure 2B:
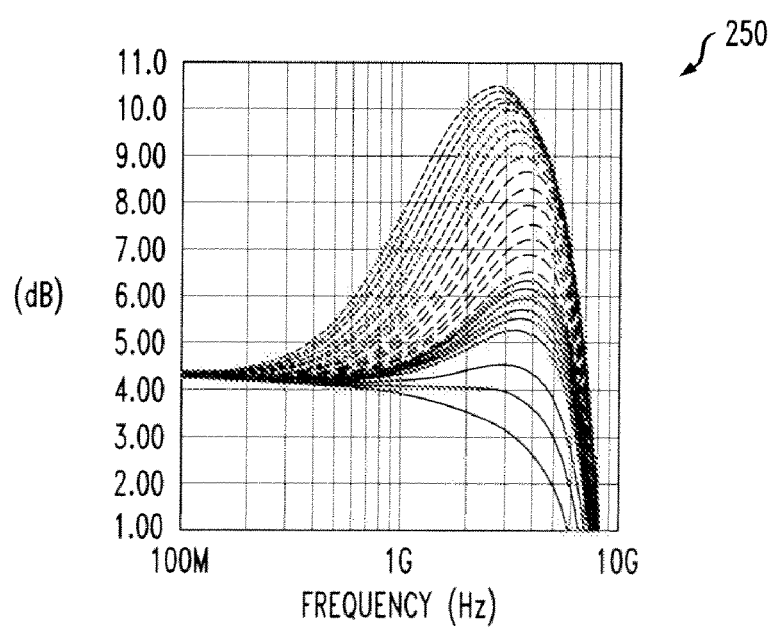

FIGS. 2A and 2B illustrate the transfer characteristics 200, 250 (magnitude as a function of frequency) of the first and second stages, respectively, of an exemplary pre-amplifier 160. Generally, a first stage of the pre-amplifier 160 applies a low and/or high pass filter, and a second stage of the pre-amplifier 160 optionally applies a high frequency boost. As shown in FIG. 2A, in the first stage, the pre-amplifier 160 trades off between high frequency and low frequency transfer characteristics. If a high frequency boost is applied, the low frequency boost is lost and vise versa. The exemplary pre-amplifier 160 provides 16 "settings" of filter options (0-15) in the first stage. Setting 0 applies the most low pass filtering (relative to the other settings) to attenuate the high frequency components of the applied signal. Setting 15 applies high pass filtering to attenuate the low frequency components. As shown in FIG. 2B, in the second stage, the pre-amplifier 160 provides a high frequency boost. In a conventional implementation, the pre-amplifier 160 employs low frequency attenuation and high frequency gain for equalization.

Figure 3A:
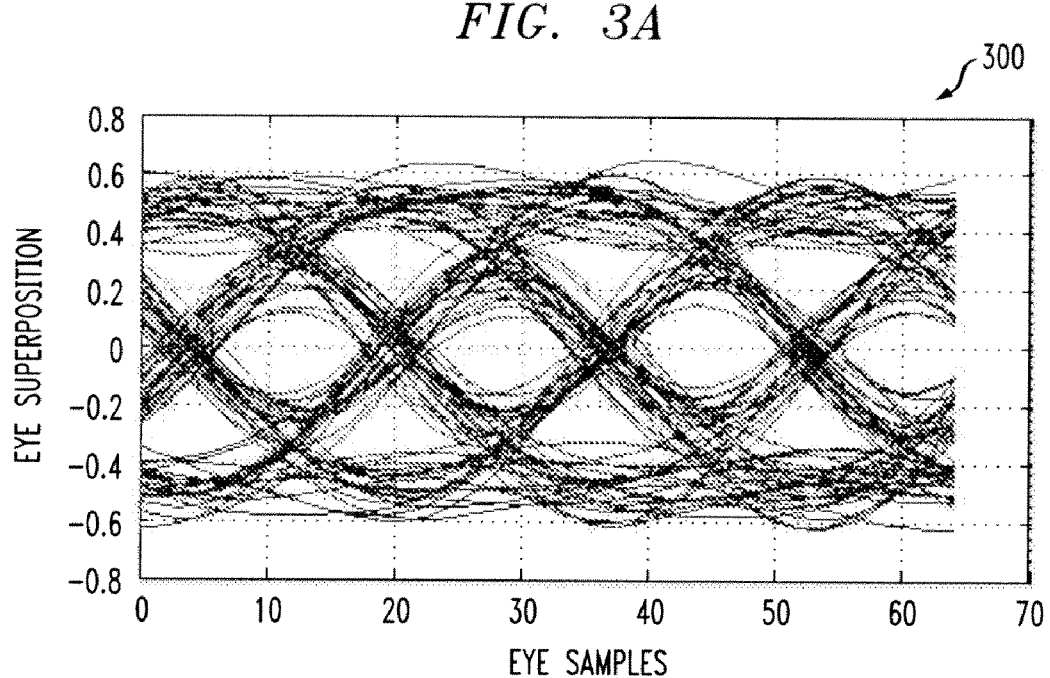
FIGS. 3A and 3B illustrate the received signal that is applied to the pre-amplifier of FIG. 1.
Figure 3B:
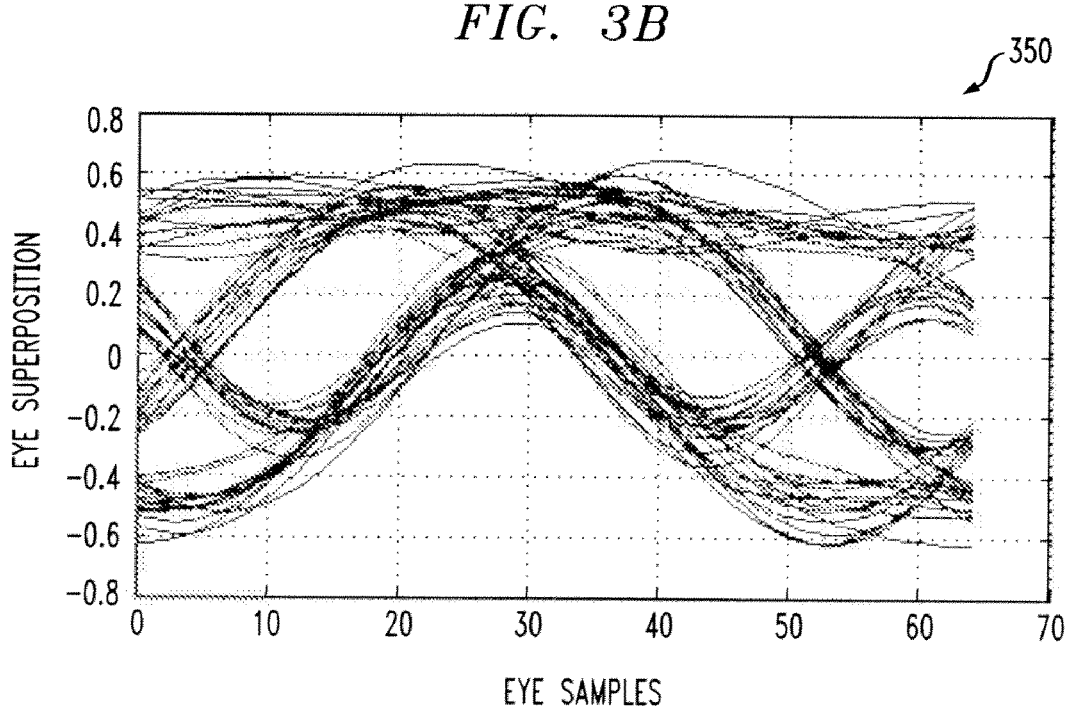

FIGS. 3A and 3B illustrate the received signal. FIG. 3A illustrates a classical data eye view 300 of the received signal and FIG. 3B illustrates a DFE data eve view 350 of the received signal. The data eye views 300, 350 can be obtained, for example, from a data eye monitor, such as those described in U.S. patent application Ser. No. 11/540,946, filed Sep. 29, 2006, entitled "Method And Apparatus For Determining Latch Position For Decision-Feedback Equalization Using Single-Sided Eye," incorporated by reference herein. While the classical data eye view 300 includes all data transitions, a DFE data eye view, also to referred to as a single-sided eye view, opens up the data eye by containing only transitions from one binary value (i.e., only 1→x or 0→x transitions). The DFE data eye view extracts a larger DFE eye by constraining the data to only contain signal transitions from, for example, a binary value 1 to a binary value of 0 or 1 (referred to as 1→x), and inhibiting any signal transitions from a binary value of 0.

As previously indicated, a long run length signal will exhibit more delay than a short run length signal. According to one aspect of the present invention, the run length delay is employed as a criterion for an equalization adaptation scheme. FIGS. 4A through 4C illustrate a long run length signal 410 relative to a Nyquist rate signal 420, under various equalization scenarios. As shown in the case of FIG. 4A, the long run length signal 410 exhibits more group delay and is said to lag the Nyquist rate signal 420 when the channel is under-equalized. As a result of the group delay, a detector in the data detector 170 placed at the transition 405 will improperly detect a binary 0 when a long 00 sequence is followed by a 1. Similarly, a detector placed at the transition 405 will improperly detect a 1 when a long 11 sequence is followed by a 0 (not shown in FIG. 4A).

Figure 4A:
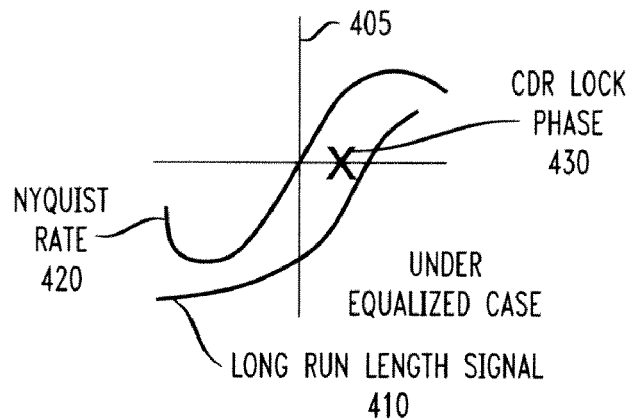
FIGS. 4A through 4C illustrate a long run length signal relative to a Nyquist rate signal, under various equalization scenarios.
Figure 4B:
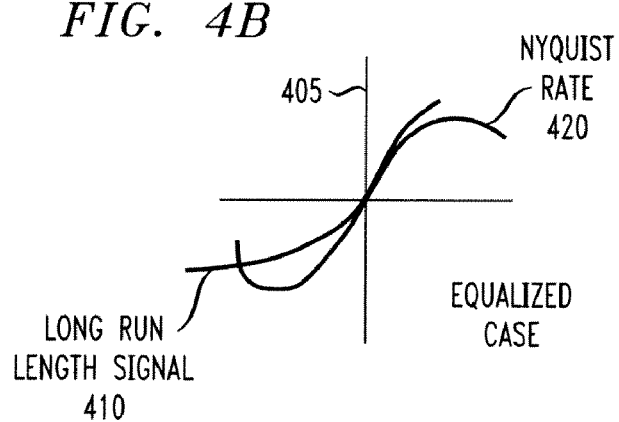

As shown in the case of FIG. 4B, the long run length signal 410 coincides in time with the Nyquist rate signal 420 when the channel equalization is optimized. In this case, the Nyquist signal 420 and the long run length signal 410 will cross transition without any substantial delay between them. As a result, a detector placed at the transition 405 will randomly detect binary 1s and 0s, mostly dictated by noise.

Figure 4C:
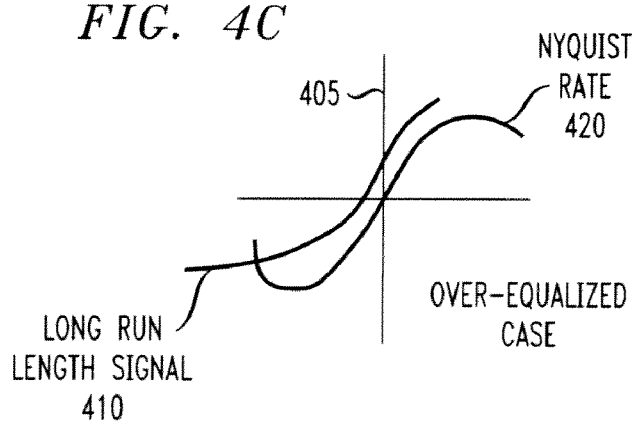

As shown in the case of FIG. 4C, the long run length signal 410 is said to lead the Nyquist rate signal 420 when the channel equalization is over-equalized. In this scenario, when a receiver receives an over equalized signal, the long run length signal 410 will arrive earlier than the Nyquist signal 420. A detector placed at the transition 405 will detect a binary 1 for the above mentioned scenario. Thus, whether the data eye detector 170 detects a zero or a one provides an indication of whether the channel is over or under equalized.

As shown in FIG. 4A, a clock and data recovery (CDR) system processing the received signal will lock at a point 430 at the middle of the group delay spread (assuming a uniform bit density). When the spread of the group delay is high, the CDR will lock at the middle of the group delay spread. By applying zero equalization in accordance with the present invention, the group delay spread is reduced and the jitter tolerance is improved. As discussed hereinafter, the equalization adaptation block 175 evaluates the group delay spread and determines an appropriate zero control correction value. The zero control correction value will apply an appropriate amount of low or high pass filtering to offset the group delay spread. A zero update will reduce the group delay spread and the CDR will lock in the middle of the reduced group delay spread.

Figure 5:
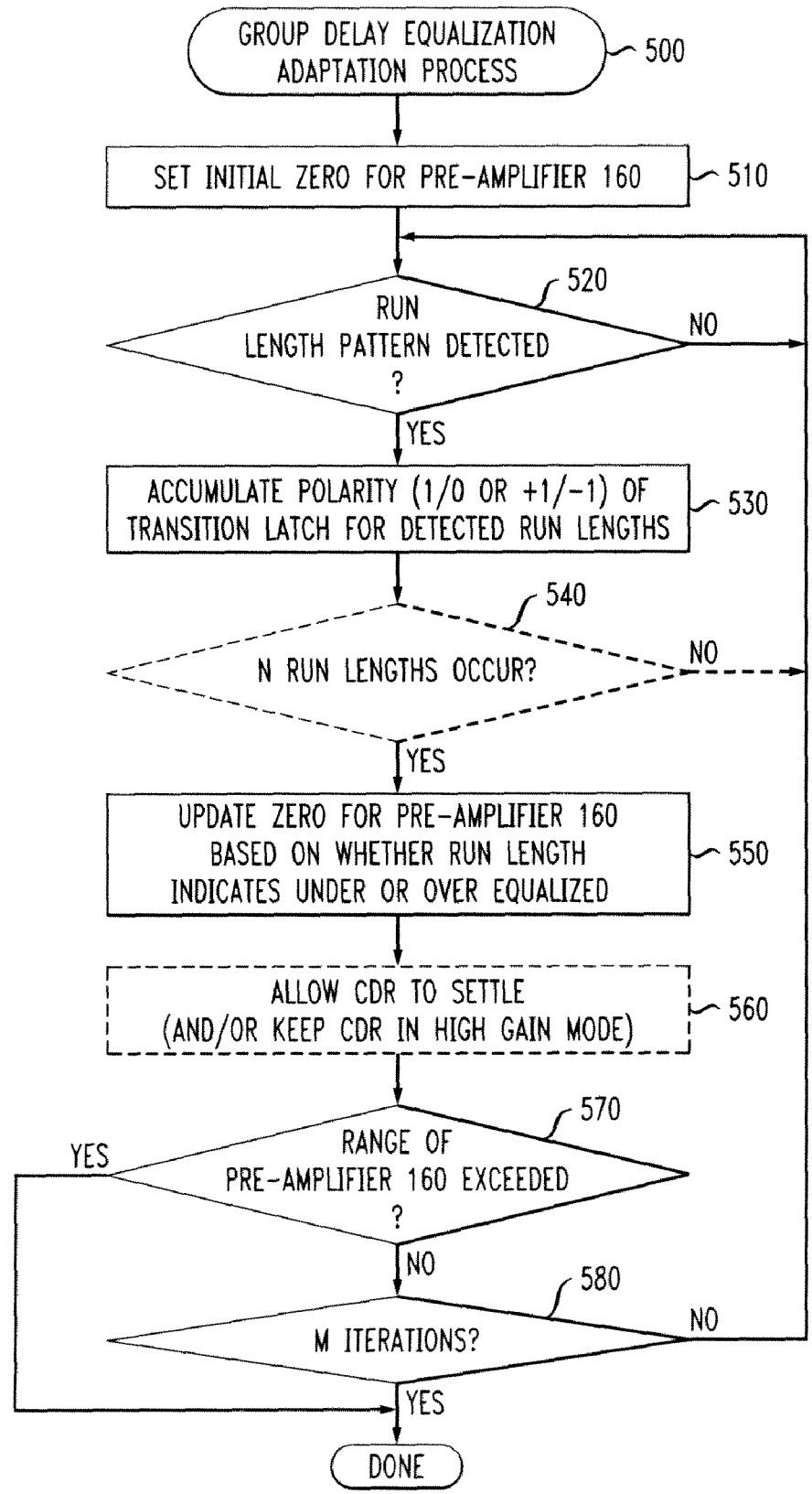
FIG. 5 is a flow chart describing an exemplary implementation of a group delay equalization adaptation process that may be implemented by the equalization adaptation block of FIG. 1.

FIG. 5 is a flow chart describing an exemplary implementation of a group delay equalization adaptation process 500 that may be implemented by the equalization adaptation block 175 of FIG. 1. As shown in FIG. 5, the exemplary group delay equalization adaptation process 500 sets the initial zero value(s) for the pre-amplifier 160 during step 510. Thereafter, the group delay equalization adaptation process 500 monitors the data detected by the data detector 170 during step 520 to determine if a run length pattern is detected.

If it is determined during step 520 that a run length is not detected then the process continues to monitor the detected data until a run length is detected. If, however, it is determined during step 520 that a run length is detected, then the occurrence of a positive or negative run length is accumulated during step 530 (based on the value of the transition bit 405).

A test is optionally performed during step 540 to determine if N run lengths have occurred. Generally, N is a window for which the statistics can be collected before the pre-amplifier 160 zero information is updated. If it is determined during step 540 that N run lengths have not yet occurred, then program control returns to step 520. If, however, it is determined during step 540 that N run lengths have occurred, then the zero value(s) of the pre-amplifier 160 are updated during step 550 based on whether the accumulated run length indicates that the channel is under or over equalized.

During step 560, the CDR is optionally allowed to settle (or the CDR is kept in a high gain mode). A test is performed during step 570 to determine if the range of pre-amplifier 160 has been exceeded. If it is determined during step 570 that the range of pre-amplifier 160 has been exceeded, then program control terminates. If, however, it is determined during step 570 that the range of pre-amplifier 160 has not been exceeded, then a further test is performed during step 580 to determine if M iterations have occurred. M optionally specifies a maximum number of updates to be performed. If it is determined during step 580 that M iterations have not yet occurred, then program control returns to step 520. If, however, it is determined during step 580 that M iterations have occurred, then program control terminates.

Thus, when the group delay equalization adaptation process 500 detects an over/under equalization situation, the process 500 will adjust the pre-amplifier zero during step 550. The pre-amplifier output phase will change when a zero is updated. As a result, the CDR phase will be updated by the first order path of the CDR loop.

At the beginning of the adaptation performed by the group delay equalization adaptation process 500, the CDR locks approximately at the middle of the group delay spread (assuming a substantially uniform pattern density). As the group delay equalization adaptation process 500 detects the group delay spread and adjusts the zero, the CDR will lock at the middle of the reduced group delay spread. The process 500 repeats and with CDR assistance the adaptation converges to optimal zero. It is noted that without CDR assistance, the adaptation converges to point 430 and stops at a local minimum. With the CDR assistance, however, the adaptation continues to adapt to a global minimum.

As the update loops continues, the group delay spread is minimized and crosses from an under-equalized state over to an over-equalized state (or vice versa). When the system crosses over to the over-equalized state, the algorithm will start to update the pre-amplifier zero. In this case, the zero will be updated towards an under equalized direction. This alternation starts to take place after the algorithm reaches convergence.

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the for of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for adapting one or more equalization parameters in a communications system, comprising:
   detecting one or more predefined run length patterns comprising a plurality of consecutive same-valued bits in a received signal;
   evaluating a transition latch value for each of said detected predefined run length patterns, wherein said transition latch value provides an indication of whether said received signal is under-equalized or over-equalized;
   adjusting said one or more equalization parameters of said communications system based on said evaluation of said transition latch value; and
   terminating said adjustment to said one or more equalization parameters if a range of said one or more equalization parameters is exceeded.

2. The method of claim 1, further comprising the step of employing said adjusted one or more equalization parameters for equalization of intersymbol interference.

3. The method of claim 1, wherein said step of evaluating a transition latch value is performed by a data eye monitor.

4. The method of claim 1, wherein said step of detecting one or more predefined run length patterns in a received signal further comprises the step of detecting at least N predefined run length patterns, where N is a window for which statistics are collected before said adjusting step is performed.

5. The method of claim 1, wherein said step of evaluating said transition latch value for each of said detected predefined run length patterns further comprises the step of accumulating said transition latch values for a predefined window.

6. The method of claim 1, wherein said one or more equalization parameters comprise one or more zero values for a pre-amplifier in said communications system.

7. The method of claim 1, further comprising the step of allowing a clock and data recovery system in said communications system to settle following said adjusting step.

8. The method of claim 1, further comprising the step of terminating said adjustment to said one or more equalization parameters if a predefined number of iterations is exceeded.

9. A system for adapting one or more equalization parameters in a communications system, comprising:
   a data eye monitor for detecting one or more predefined run length patterns comprising a plurality of consecutive same-valued bits in a received signal and for evaluating a transition latch value for each of said detected predefined run length patterns, wherein said transition latch value provides an indication of whether said received signal is under-equalized or over-equalized; and
   at least one processor, coupled to a memory, operative to adjust said one or more equalization parameters of said communications system based on said evaluation of said transition latch value and terminate said adjustment of said one or more equalization parameters if a range of said one or more equalization parameters is exceeded.

10. The system of claim 9, wherein said adjusted one or more equalization parameters are employed for equalization of intersymbol interference.

11. The system of claim 9, wherein said data eye monitor is further configured to detect at least N predefined run length patterns, where N is a window for which statistics are collected before said adjusting step is performed.

12. The system of claim 9, wherein said transition latch values are accumulated for a predefined window.

13. The system of claim 9, wherein said one or more equalization parameters comprise one or more zero values for a pre-amplifier in said communications system.

14. The system of claim 9, wherein a clock and data recovery system in said communications system settles following said adjustment.

15. The system of claim 9, wherein said at least one processor is further configured to terminate said adjustment to said one or more equalization parameters if a predefined number of iterations is exceeded.

16. A data eye monitor, comprising:

means for detecting one or more predefined run length patterns in a received signal;

means for evaluating a transition latch value for each of said detected predefined run length patterns comprising a plurality of consecutive same-valued bits, wherein said transition latch value provides an indication of whether a received signal is under-equalized or over-equalized;

means for determining an adjustment to one or more equalization parameters based on said evaluation of said transition latch value; and means for terminating said adjustment to said one or more equalization parameters if a range of said one or more equalization parameters is exceeded.

17. The data eye monitor of claim 16, wherein said adjusted one or more equalization parameters are employed for equalization of intersymbol interference.

18. The data eye monitor of claim 16, wherein said data eye monitor is further configured to detect at least N predefined run length patterns, where N is a window for which statistics are collected before said adjusting step is performed.

19. The data eye monitor of claim 16, wherein said transition latch values are accumulated for a predefined window.

20. The data eye monitor of claim 16, further comprising means for terminating said adjustment to said one or more equalization parameters if a predefined number of iterations is exceeded.

* * * * *